United States Patent
Appleby et al.

(10) Patent No.: US 7,882,230 B2
(45) Date of Patent: Feb. 1, 2011

(54) METHOD AND SYSTEM FOR DYNAMICALLY ALLOCATING SERVERS TO COMPUTE-RESOURCES USING CAPACITY THRESHOLDS

(75) Inventors: Karen Appleby, Ossining, NY (US); German Goldszmidt, Dobbs Ferry, NY (US)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 12/061,019

(22) Filed: Apr. 2, 2008

(65) Prior Publication Data

US 2008/0183865 A1    Jul. 31, 2008

(51) Int. Cl.
*G06F 15/173*    (2006.01)
(52) U.S. Cl. ..................................... 709/226
(58) Field of Classification Search ................ 709/226
See application file for complete search history.

(56) References Cited

U.S. PATENT DOCUMENTS

| | | | |
|---|---|---|---|
| 6,466,980 B1 | 10/2002 | Lumelsky et al. | |
| 6,601,084 B1 | 7/2003 | Bhaskaran et al. | |
| 7,092,798 B2 | 8/2006 | Mansingh et al. | |
| 7,181,523 B2 * | 2/2007 | Sim | 709/226 |
| 7,373,644 B2 * | 5/2008 | Aborn | 718/105 |
| 7,587,492 B2 * | 9/2009 | Dyck et al. | 709/226 |
| 2004/0010544 A1 | 1/2004 | Slater et al. | |
| 2004/0267897 A1 | 12/2004 | Hill et al. | |
| 2008/0162700 A1 * | 7/2008 | Aborn | 709/226 |

* cited by examiner

*Primary Examiner*—Thu Nguyen
*Assistant Examiner*—Brian P Whipple
(74) *Attorney, Agent, or Firm*—Whitham, Curtis, Christofferson & Cook, P.C; Stephen C. Kaufman

(57) ABSTRACT

Servers are allocated for use in one of a plurality of compute-resources or for stand-by storage in a free-pool. Server load metrics are selected (e.g., ping-reply time or CP utilization) for measuring load in the servers. Metrics are measured for the servers allocated to the compute-resources. Several metrics can be measured simultaneously. The metrics for each compute-resource are normalized and averaged. Then, the metrics for each compute-resource are combined using weighting coefficients, producing a global load value, G, for each compute-resource. The G value is recalculated at timed intervals. Upper and lower thresholds are set for each compute-resource, and the G values are compared to the thresholds. If the G value exceeds the upper threshold, then a server in the free-pool is reallocated to the compute-resource; if the G value is less than the lower threshold, then a server is moved from the compute-resource to the free-pool.

19 Claims, 8 Drawing Sheets

METHOD AND SYSTEM FOR DYNAMICALLY ALLOCATING SERVERS TO COMPUTE-RESOURCES USING CAPACITY THRESHOLDS

BACKGROUND OF THE INVENTION

1. Field of the Invention

The present invention relates generally to compute-resources (sets of servers that are logically and physically isolated from one another for the purpose of security and dedicated usage) and methods for allocating servers between compute-resources based on a new capacity threshold. More specifically, the present invention relates to a method for setting capacity thresholds, monitoring the computation load on each compute-resource, and reallocating servers when thresholds are exceeded.

2. Background Description

Compute-resources are commonly used for applications supporting large numbers of users, and those that are central processor unit (CPU) intensive and highly parallizable. Examples of such compute-resources include web-applications hosted by Internet service providers (ISPs), and many scientific applications in areas such as Computational Fluid Dynamics Often in such computing environments, load can vary greatly over time, and the peak to average load ratios are large (e.g., 10:1 or 20:1). When the load on a customer site drops below a threshold level, one of its servers is quiesced (removed from service), "scrubbed" of any residual customer data, and assigned to a "free-pool" of servers that are ready to be assigned. Later, when the load on another customer exceeds some trigger level, a server from the free-pool is primed with the necessary operating system (OS), applications, and data to acquire the personality of that customer application. Currently, there are few systems that support dynamic allocation of servers. Those that do exist depend on manually derived thresholds and measures of normal behavior to drive changes resource allocation. There are no automated effective and efficient methods for determining when a particular compute-resource is overloaded or under loaded that is relatively independent of application modifications.

Parallel computing and Server-Farm facilities would benefit greatly from an automatic method for monitoring available capacity on each compute-resource, and allocating servers accordingly. Such a system would provide more efficient use of servers, allowing groups of compute-resources to provide consistent performance with a reduced number of total servers. Such a system would be particularly applicable to large ISPs, which typically have many compute-resources that each experience significant changes in computing load.

SUMMARY OF THE INVENTION

According to the present invention, a method and system dynamically allocate servers among a plurality of connected server compute-resources and a free-pool of servers. Each server compute-resource comprises a plurality of servers. Each server allocated to a compute-resource is monitored for one metric. For each monitored metric and for each compute-resource, a normalized average metric value P is calculated, and for each compute-resource, a global load value G is calculated. This global load value is a linear combination of normalized average metric values. For each compute-resource, a lower and an upper threshold for the global load value are defined. The calculated global load value G is compared to the lower and the upper thresholds. If a compute-resource has a global load value G which is greater than the upper threshold, it is declared overloaded and a server is removed from the free-pool and allocated to the overloaded compute-resource. If the compute-resource has a global load value G which is less than the lower threshold, it is declared under loaded and a server is removed from it and allocated to the free-pool. If there is an under loaded compute-resource with a global load value G less than the lower threshold and an overloaded compute-resource with a global load value G greater than the lower threshold, then a server is removed from the under loaded compute-resource and allocated to the overloaded compute-resource.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention provides a method for computing the maximum load on a compute-resource and for allocating resources among a plurality of compute-resources in a manner that prevents each compute-resource's maximum from being exceeded. More specifically, this invention embodies a method to derive a Maximum-Load Vector for each compute resource and to build allocation threshold equations based on the computed current and maximum load.

As an illustrative example we will show how these thresholds can be used to drive server allocations in a hosted environment. Servers, or more generically resources, are allocated according to the load on each compute-resource. In the example environment, each server is assigned to one compute-resource or to a free-pool. Servers assigned to a compute-resource are used for functions specific to the compute-resource (e.g., each compute-resource can be used for a particular website, used for a particular application, or used for a particular division within a company). Servers assigned to the free-pool are typically idle but available for allocation to one of the compute-resources. If a compute-resource becomes overloaded (i.e., if the load on the compute-resource rises above the RT-Transition Point), then a server from the free-pool is allocated to the overloaded compute-resource. If a compute-resource becomes under loaded (i.e., if the load on the compute-resource decreases below a pre-established threshold), then a server from the under loaded compute-resource is allocated to the free-pool. In this way, computing capacity in each compute-resource is adjusted in response to changing load demands.

In the present invention, the compute-resources are monitored for signs of overloading or under loading. Monitoring is performed by measuring selected load metrics, e.g., ping-reply time or central processor (CP) utilization (the percentage of a resource's capacity which is actually used, over some period of time) or other metrics indicative of the load. The metric values are normalized, smoothed, and averaged over each compute-resource. The resulting metric values are used to determine if a compute-resource is overloaded or under loaded. Several metrics may be used in combination, with individual weighting factors for each.

Figure 1:
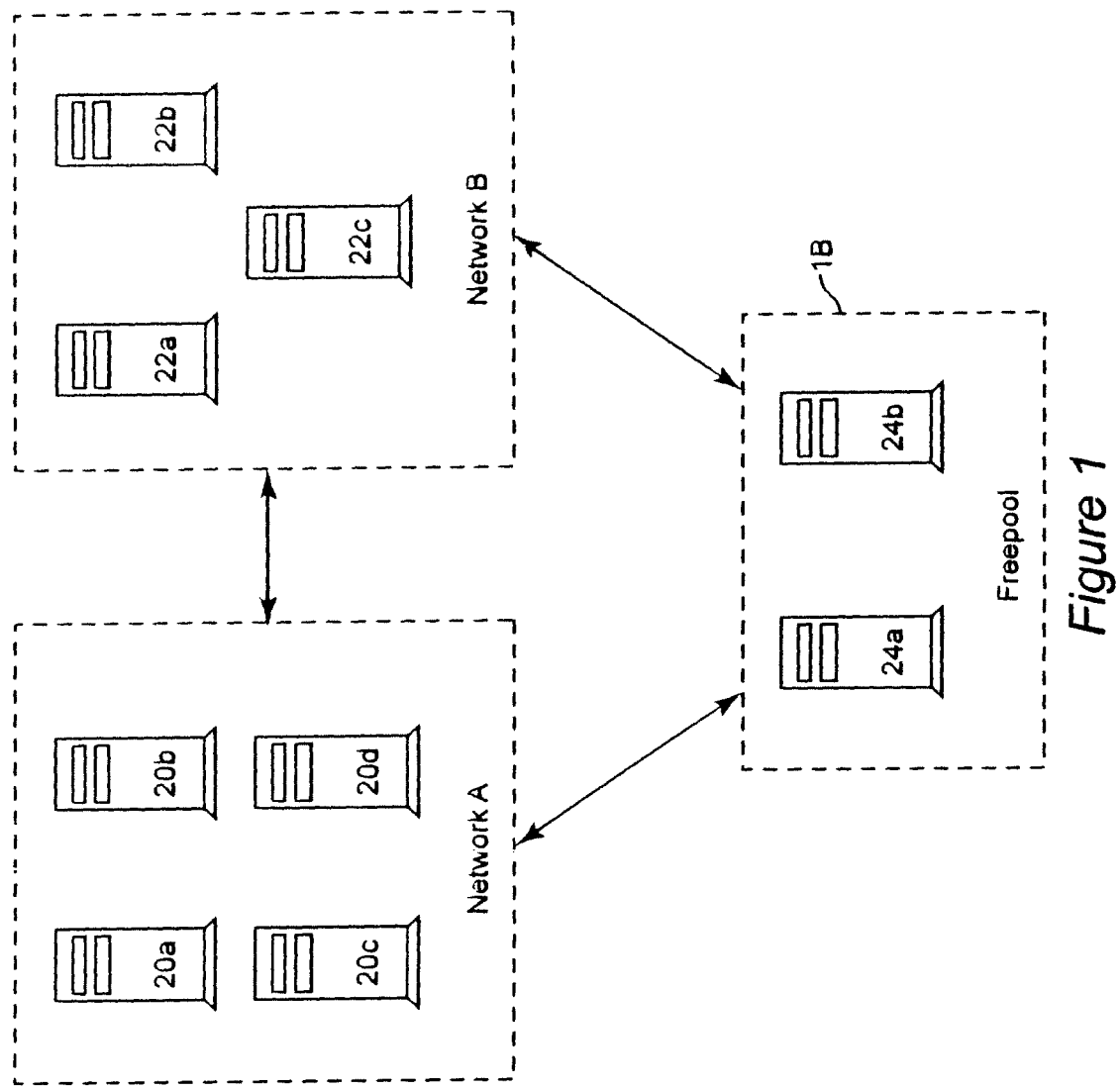
FIG. 1 is a block diagram showing two connected compute-resources and a free-pool according to an exemplary embodiment of the invention.

Referring now to the drawings, and more particularly to FIG. 1, there is illustrated two compute-resources (generally indicated as Network A and Network B and referred to herein as compute-resources A and B) and a free-pool 18 according to the illustrative example. In the specific illustration of FIG. 1, compute-resource A has four servers 20a-20d, compute-resource B has three servers 22a-22c, and the free-pool 18 has two servers 24a-24b. The servers 20, 22 and 24 may be logically isolated from one another through programmable hardware such as a virtual local area network (LAN). Any of the servers 20, 22 and 24 can be reallocated to the free-pool. The free-pool can have zero to any number of servers. Servers can be reallocated manually or automatically using remotely configurable hardware such as virtual LANs. Compute-resource A and compute-resource B each support distinct computing tasks. For example, compute-resource A and compute-resource B can each support different websites or parallel applications like ray tracing.

Figure 2:
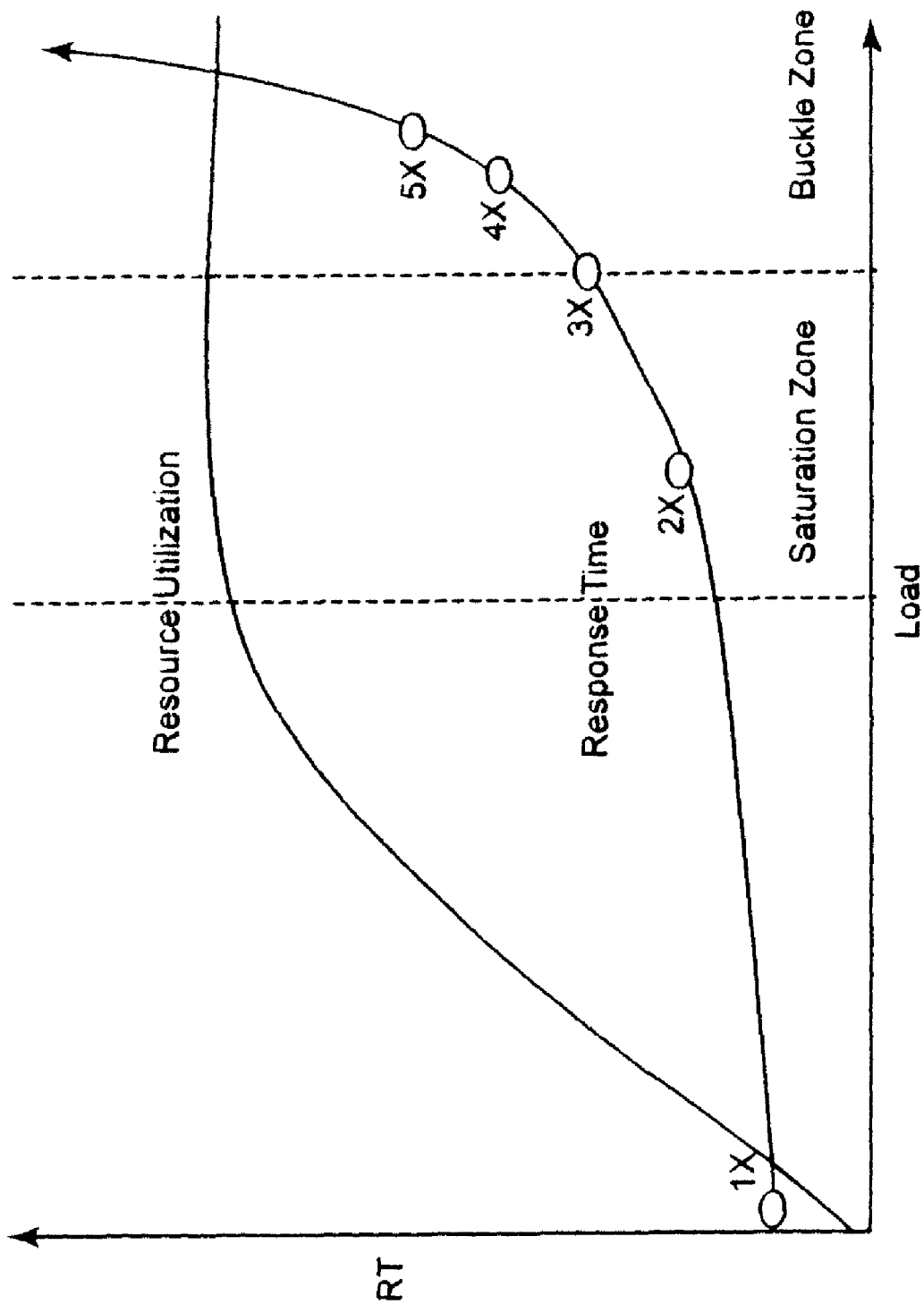
FIG. 2 is a graph showing a plot of response time versus load for a particular server or compute-resource.

FIG. 2 shows a plot of response time versus compute-resource load. Load is defined as the percentage of allocated compute resources consumed by the current set of processes being run on the allocated resources. FIG. 2 illustrates that the end-user response time increases very little in response to changes in load on the target server or compute-resource (the server or compute-resource the end-user request is being run on), until the server or compute-resource reaches its saturation point (utilization is close to 100%). Once saturation is reached, response time (RT) will degrade exponentially in response to changes in load. This phenomenon is partially caused by request dropping. Request dropping triggers request retransmission which rapidly escalates the overload condition. Once the response time starts to degrade exponentially, one can expect performance to deteriorate rapidly if load continues to climb. Hence, in the present invention, it is desirable for all the servers and compute-resources to have loads that are less than the load at which saturation will occur. In other words, the load should be limited to an amount indicated at 28a or less, for the idealized server or compute-resource represented by FIG. 2, we call this the response-time-transition point (RT transition).

It is important to note that different server types will become saturated at different levels of load. In other words, the curve can move to the left or to the right, and its slope may vary. Thus, each application and server-type pair will have its own RT curve.

Of course, the load on a server or compute-resource cannot be measured directly. Instead, metrics are used to indirectly measure the load, so that the load can always be maintained below the RT transition limit 28a In operation, we assume there is a management system that collects the required monitoring metrics on each server, and makes allocation requests using the methods described here or some other method. In the example system, the decision to donate or request a server is made independently for each compute-resource. Thus, each compute-resource can be self-managed (in a trusted environment), centrally managed, or managed by a distributed management system. Alternate schemes that use coordinated allocation decision making can also be used.

In the present invention, the monitoring system measures predetermined metrics that are indicative of the load on each server and the load on each compute-resource. In combination, the metrics can be used to approximate load, which itself can not be captured by a single metric. Several metrics useful in the present invention include:

Ping-reply time (HTTP head ping-reply): The time required for a server to reply to an empty request, i.e., that does not include any server processing time. The ping-reply time is a reasonable measure of TCP stack delay and is a very good indicator of load.

Central processor (CP utilization): The percentage of time that a machine's processors are busy. The CP utilization metric is typically expressed as a percentage value.

Mbufs denied: The number of message buffers requests denied. This metric correspond to the number of dropped packets on the network.

SkBuf: The number of socket buffers actively being used in a particular server. This metric correlates well with Ping-Reply.

Some of the other metrics known in the art that can be used with the present invention include request-arrival rate, transfer control protocol (TCP) drop rate, active-connections, and request processing time (end-user response time minus the time spent in the network and in queues).

In the present invention, the metrics are measured for each server. Preferably, several complementary metrics are used simultaneously. Generally, it is preferred for the metric to be somewhat insensitive to changes in the application or traffic mix. Ping-reply and SKBufs are the most robust in this way.

In the method of the present invention, N metrics may be used; each metric is designated $n_1$, $n_2$, $n_3$, etc. Each compute-resource has S servers, with each server designated as $s_1$, $S_2$, $S_3$, etc. Every server can be of the same type or different in a compute-resource.

In the present invention, each compute-resource has a maximum value for each metric on each server type supported. This is illustrated in FIG. 2. Specifically, the maximum metric value is the average observed value (over several runs) of the metric when the response time reaches the RT-transition point. For example, if the RT-transition point is 1.7x (x being the RT of an unloaded machine), then the maximum metric value will be the metric value that corresponds with a response time of 1.7x.

In the present invention, the maximum metric value for metric n (n is the metric index) on a server of type t, in a compute-resource is $Mn_t$. The response time of each server type will respond uniquely in response to changes in the metric value. Therefore, each server type has a separate maximum metric value $Mn_t$ for each metric. $Mn_t$ will typically be determined empirically under a typical load mix for the compute-resource, by measuring the metric when the load is that recorded at the RT-Transition Point.

In the present invention, it is necessary to define a standard server, indicated herein by "std". A standard server can be a server of any server type found in the target compute-resource. A maximum load vector for the compute resource being profiled is defined and is given in terms of standard server maximums:

$$MaxLV_{compute\_resource} = (M1_{std}, \ldots, MN_{std})$$

In performing calculations according to the present invention, all values are converted in to standard server units. For example if std has a maximum CPU utilization of 45% and servers of type t have a maximum CPU utilization of 90%, a CPU utilization of 45% on a server of type t is equivalent to 25%, which is 50% of the maximum on the standard server. The maximum value for metric n for the standard server is given by $Mn_{std}$. For any other server, s, the maximum value for metric n is given by $Mn_s$, and is dependent on the type of the server.

In order to combine metrics from heterogenous servers, a capacity weight for each unique server type t and compute-resource must be computed. The metric capacity weight roughly corresponds to how many standard servers the server type in question is equivalent to for each of the metrics used to measure load. For a given compute-resource, the capacity weight for the nth metric for servers of type t is $$MWn_t = \frac{Mn_t}{Mn_{stdr}}$$

In the present invention, the metrics are collected from each server in each compute-resource periodically. The metrics can be collected centrally at predefined timed intervals, or can be maintained locally and forwarded to the resource allocation component only when their RT-transition point is reached. Preferably, the metrics are measured every 1-10 minutes, although they can be measured more or less often as needed.

The present measured value is updated every time the metric is measured. The present value $Pn_s$ may be noisy and highly variable for reasons other than persistent changes in the amount of load (e.g., changes in the request processing path, or temporary spikes in the load). Therefore, the present measured value $Pn_s$ should be smoothed according to well known data smoothing or filtering techniques (e.g., double exponential smoothing).

The present value for each metric is first smoothed and then combined across the compute-resource's active server set to create a normalized average compute-resource metric value, $P_n$. The normalized, smoothed average metric value $P_n$ is:

$$P_n = \left( \frac{\sum_{s \in S} \text{measured\_value} M_{n(s)}}{\sum_{s \in S} MWn_{t(s)}} \right)$$

where m is the number of servers in S. Compute-resource A and compute-resource B each have normalized and smoothed average metric values PAn and PBn for each metric. For example, if compute-resource A and compute-resource B are monitored using three metrics, (e.g., ping-reply time (n=1), CP utilization (n=2), and Mbuf requests (n=3)), then compute-resource A will have three metric values ($PA_1$, $PA_2$, $PA_3$), and compute-resource B will have three metric values ($PB_1$, $PB_2$, $PB_3$).

Next, the metric values (e.g., ($PA_1$, $PA_2$, $PA_3$) and ($PB_1$, $PB_2$, $PB_3$)), are divided by their corresponding maximum metric value. This gives us the percentage of the maximum metric value each present metric value is. This array is called the Current Percent of Maximum Load Vector (% CurrMLV) and is given by:

$$\% CurrMLV = \left( \frac{P_1}{M_{1\_std}}, \ldots, \frac{P_n}{M_{n\_std}} \right)$$

We can then define a single site Load value that represents the aggregate load on a compute-resource as the sum of the % CurrMLV values multiplied by weighting coefficients ($C_1$, $C_2$, $C_3$) to produce a global load value G for each compute-resource:

For compute-resource A: $G_A = C_1\% \text{ CurrMLV}_{A1} + C_2\% \text{ CurrMLV}_{A2} + C_3\% \text{ CurrMLV}_{A3}$ For compute-resource B: $G_B = C_1\% \text{ CurrMLV}_{B1} + C_2\% \text{ CurrMLV}_{B2} + C_3\% \text{ CurrMLV}_{B3}$ This resultant load value is an approximation of the percent of the maximum the current load is.

Formally the compute-resource load is given by:

Let $C_n$ be the metric weight of the nth metric between 0 and 1. This value determines how much the measured metric contributes to Load $$\sum_{n=1}^{N} C_n = 1$$

$$\text{Load} = \sum_{n=1}^{N} (C_n * \% CurrMLV_n)$$

The weighting coefficients $C_1 \ldots C_n$ are selected according to which metrics are most reliable and accurate. If a metric is highly reliable and accurate for determining load, then its associated weighting coefficient should be correspondingly large. In other words, the magnitude of a coefficient should be commensurate with the quality of its associated metric. The weighting coefficients $C_1$, $C_2$, $C_3$ allow several unreliable and fallible metrics to be combined to create a relatively reliable measurement of load. Values for the coefficients $C_1$, $C_2$, $C_3$ can be selected by a compute-resource administrator or by software based on the types of load. If various combinations of the metrics are reliable more then one G value can be defined. For example if $C_1$ alone is reliable and $C_2$ and $C_3$ in combination are reliable, we can define $G_{A1}$ as $\{1, 0, 0\}$ and $G_{A2}$ as $\{0, 0.5, 0.5\}$. In this case, we will flag a threshold violation if either one of these values exceeds the threshold set for the compute-resource.

If only one metric is used, then the weighting coefficients and linear combination calculation are not necessary. In this case, global load values $G_A$ and $G_B$ are equal to the normalized average metric values $P_A$ and $P_B$.

For compute-resource A: $G_A = P_A$, and
for compute-resource B: $G_B = P_B$, when a single metric is used.

The global load values $G_A$ and $G_B$ are used in the present invention to determine when servers should be reallocated.

In the present invention, upper (as a function of the maximum server load) and lower (as a function of the upper) global load value thresholds are set for each compute-resource. In operation, each time the global load values $G_A$ and $G_B$ are measured, they are compared to the thresholds. When G exceeds an upper threshold for a specified time, a compute-resource is considered overloaded and a server from the free-pool is reallocated to the overloaded compute-resource. Similarly, when G is less than a lower threshold, a compute-resource is considered under loaded and a server from the under loaded compute-resource is reallocated to the free-pool.

Figure 3:
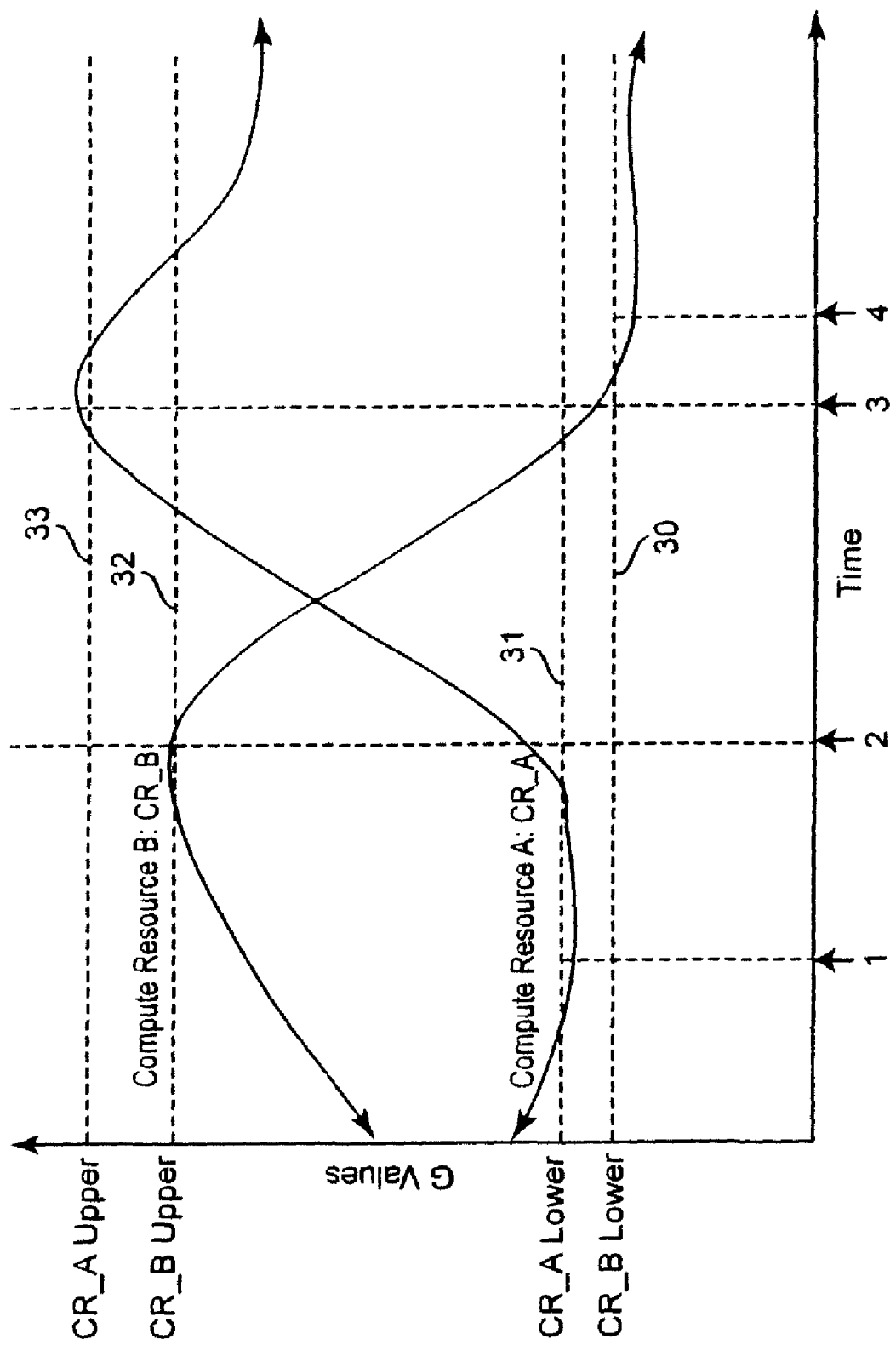
FIG. 3 is a graph showing a plot of global load values versus time, illustrating the method of the present invention.

This process is illustrated in FIG. 3, which shows plots of global load values $G_A$ and $G_B$ versus time. Compute-resource A has lower threshold 31 and upper threshold 33, while compute-resource B has lower threshold 30 and upper threshold 32.

At time 1, $G_A$ drops below the lower threshold 31. Compute-resource A is under loaded. Consequently, a server from compute-resource A is reallocated to the free-pool.

At time 2, $G_B$ exceeds the upper threshold 32. Compute-resource B is overloaded. Consequently, a server from the free-pool is reallocated to compute-resource B.

At time 3, $G_A$ exceeds the upper threshold 33. Compute-resource A is overloaded. Consequently, a server from the free-pool is reallocated to compute-resource A.

At time 4, $G_B$ drops below the lower threshold 30. Compute-resource B is under loaded. Consequently, a server from compute-resource B is reallocated to the free-pool.

In this way, servers in the compute-resources are reallocated according to where they are needed most, and reallocated to the free-pool if they are not needed. When loads are light, the free-pool maintains a reserve of idle servers that can be reallocated to any compute-resource.

It is important to note that reallocating a server to or from a compute-resource will slowly change the G value of a compute-resource as load is shifted to or from the added or removed server. A newly added server's metric values are not added to the G value until it has had a change to take over its portion of the compute-resources total load.

When deciding to add additional capacity, one has to take into account the current number of resources. Adding an additional server to a set of two is not the same as adding an additional server to a set of one hundred. A load of 90% of the maximum may be fine when you have a server set of one hundred, but may be too high when it contains only three servers. This argument also applies to resources of different capacities. For example, a CPU utilization that is 90% of the maximum does not have the same implications for processors with different clock rates (e.g., 600 and 1500 MHz). To account for these differences in excess capacity we can provide a threshold range, and then compute our current threshold based on the current capacity. We may want to have a CPU utilization threshold that is between 70% and 90%. Once we have ten or more servers we will use the 90% threshold. If we have between one and ten servers, we set the threshold to a value between 70% and 90%. The increment to be added to the threshold is simply set to the threshold range divided by the number of resources the build up was to occur over. Giving us:

$$\text{Threshold\_Increment} = \frac{\text{Threshold\_High} - \text{Threshold\_Low}}{\text{Size\_Growth\_Interval}}$$

The following code snippet shows how the actual threshold values are adjusted during execution.

```
IF (current#Servers < min#Servers +
            Size_Growth_interval)
{
    current_Adjustment=current#Servers-
        (min#Servers*Threshold_Adjustment);
```

```
    allocationThresholdValue=minAllocationThresholdValue+
        current_Adjustment;
    deallocationThresholdValue=minDeallocationThresholdValue-
        current_Adjustment;
}
```

Selecting the size and type of server to allocate will depend on a number of factors, including the length of time the server is expected to be needed, and how high the load may go. Such predictions of future load are not covered in this paper, but can be found in the open literature.

To prevent thrashing (i.e., repeatedly allocating and de-allocating servers) the server de-allocation process should be disabled for the given site for a fixed period of time after a server allocation is performed. Additionally the de-allocation threshold should be chosen carefully. For example assume that the maximum server load is reached for a single server site at 300 requests/sec. After an additional server is added (of equal capacity), each server will receive approximately 150 requests/sec. In this case, the de-allocation process should not be triggered unless there are fewer then 150 requests/sec being routed to each of the allocated servers. In general no server should be de-allocated unless:

$$\text{Curr\_Total}_{req/sec} < \frac{\text{Server\_Max}_{req/sec} * (N-1)}{N} - \left(\text{Server\_Max}_{req/sec} - \text{Server\_Min}_{req/sec}\right)$$

Curr_Totalreq/sec: Is the total number of requests per second currently being received by the site Server_Maxreq/sec: Is the maximum number of requests per second that the standard server can handle Server_Maxreq/sec: Is the maximum number of requests per second that the standard server can handle N: Is the normalized number of standard servers currently allocated, i.e. units of compute capacity.

DeAllo_Buff_size: Number of requests below the maximum that should trigger a server de-allocation.

To ensure that normal fluxuations in request rates do not trigger resource rebalancing the Curr_Totalreq/sec value should be smoothed. We were able to eliminate threshing using this de-allocation function.

Preferably in the invention, the global load values $G_A$ and $G_B$ are smoothed so the thresholds 30, 31, 32, and 33 (FIG. 3) are not repeatedly crossed multiple times when global load values are close to the thresholds. Smoothing will tend to decrease the frequency of server reallocations.

Also, to protect against frequent server reallocations, several consecutive threshold violations are required before the reallocation process is triggered. For example, before reallocation of a server to compute-resource A, the present system may require two, three, four, or more consecutive measurements of $G_A$ in excess of the upper threshold 33. Requiring several consecutive threshold violations will tend to reduce the frequency of server reallocations.

Alternatively, threshold violations for a minimum period of time may be required before server reallocation. For example, before reallocation of a server to compute-resource A, the present system may require one, five, or ten minutes of $G_A$ in excess of the upper threshold 33.

The upper and lower thresholds for the compute-resources are easily changeable and programmable. Preferably, the upper and lower thresholds for each compute-resource can be adjusted by a compute-resource administrator. The compute-resource administrator may wish to adjust the upper and lower thresholds according to compute-resource conditions and type and amount of load. Preferably in the invention, the upper thresholds are not settable to values that correspond to metric values greater than the maximum metric values $Mn_r$. Preferably in the invention, the maximum metric values $Mn_r$ create a maximum setting for the upper threshold.

It is noted that servers can also be directly transferred between compute-resources, without being allocated to the free-pool. The use or lack of use of a free-pool is not a requirement of this threshold setting process, as the allocation procedure itself is not a part of this embodiment. However, whatever allocation process is used should ensure that any sensitive data is removed from a server before the server is allocated to a new compute-resource.

Also, it is noted that a server allocated to the free-pool necessarily does not perform functions related to compute-resources A and B. Servers in the free-pool are typically idle. Allocation of a server to the free-pool might not require any special type of allocation. The servers in the free-pool may be idle machines that are simply not allocated to any particular compute-resource or function.

It is noted that reallocation of a server does not require physical movement of the server. Typically, reallocation is performed by loading the server with a new image (operating system and application), and assigning it to the new compute-resource.

Figure 5A:
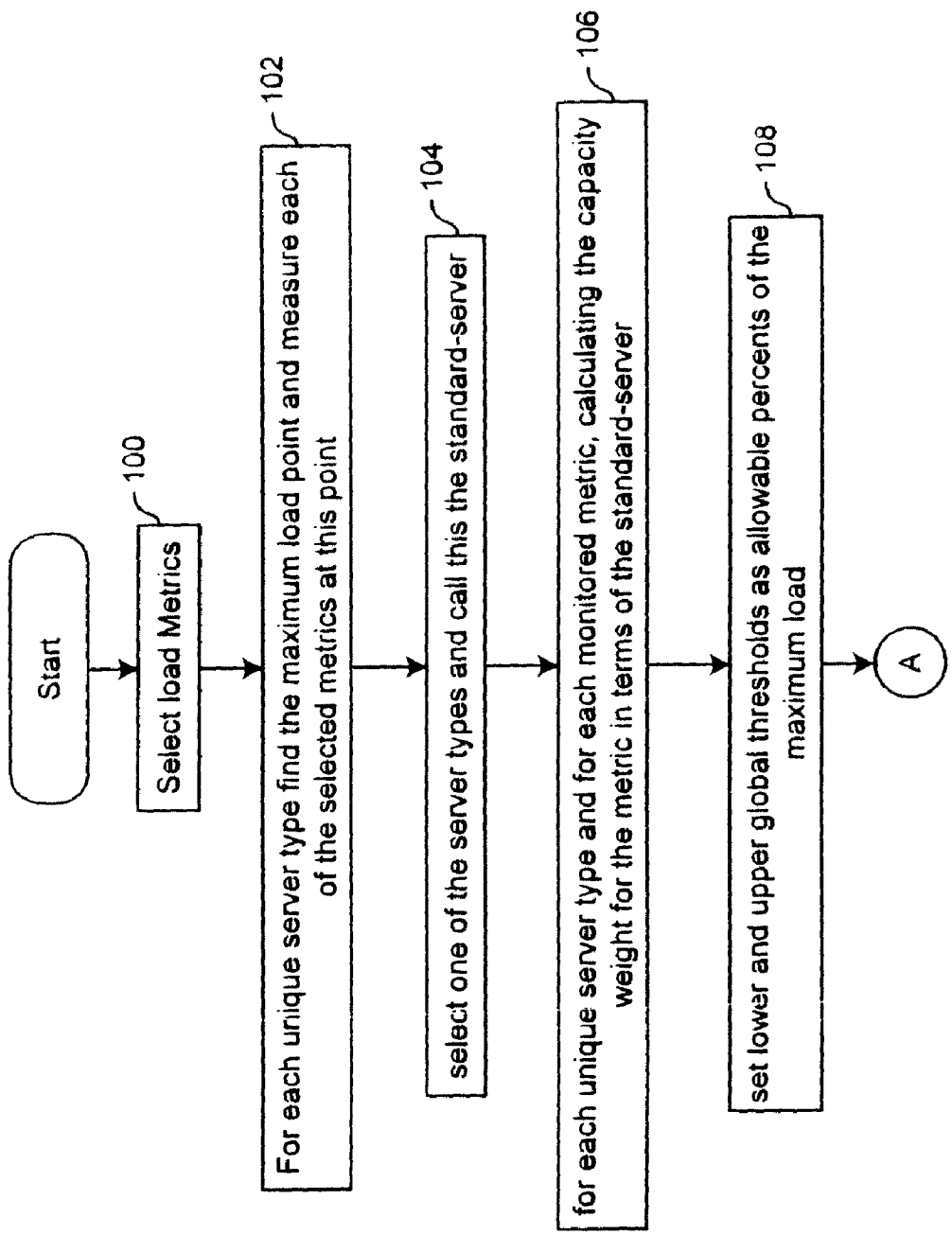
FIGS. 5A, 5B and 5C, taken together, are a flow chart illustrating the process of the method according to the invention.
Figure 5B:
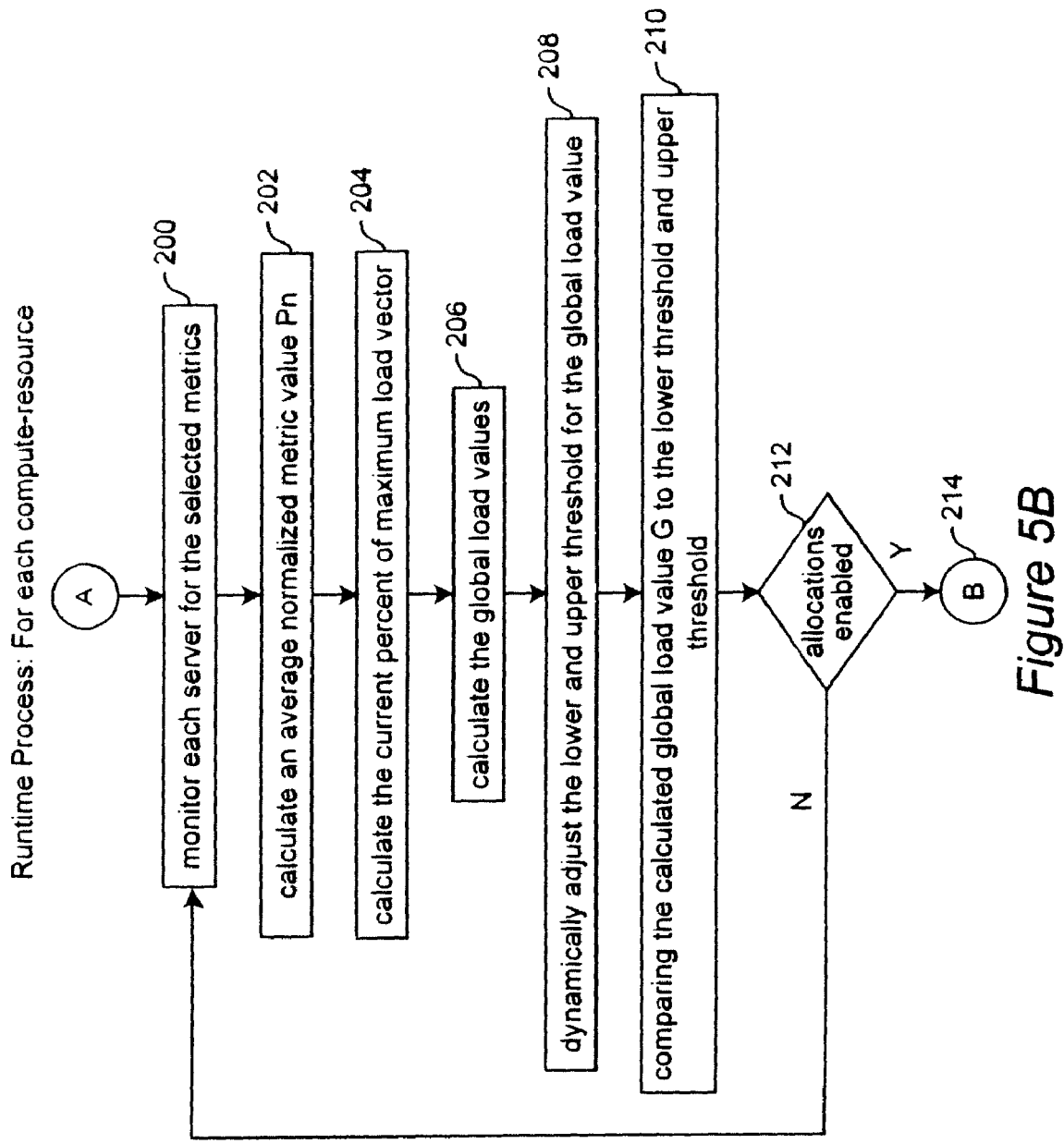
Figure 5C:
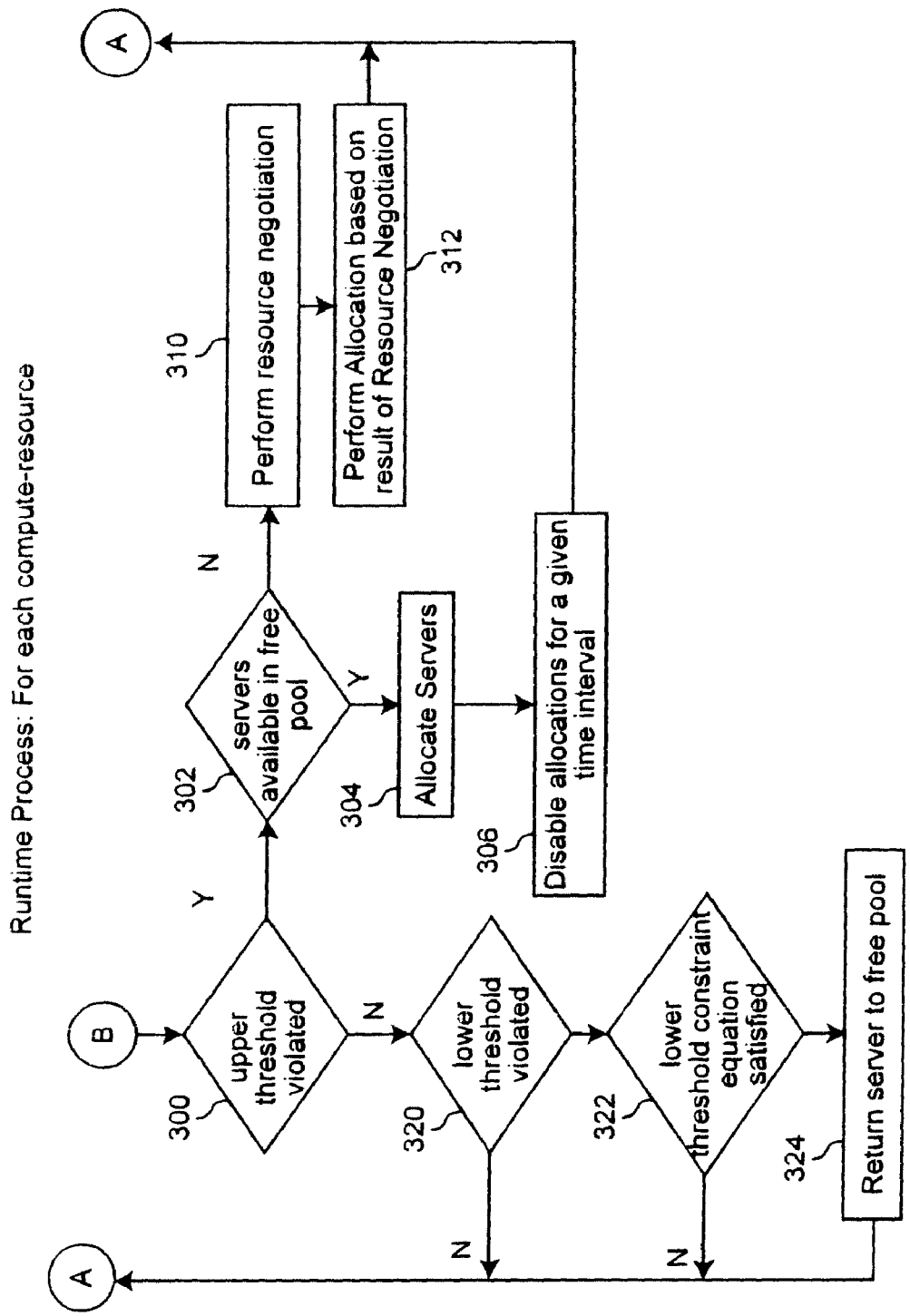

FIGS. 5A, 5B and 5C, taken together, show a flow diagram illustrating the method of the present invention. The steps illustrated in the flow diagram are described below:

Step 100: Metric types that are good representations of load for the given compute-resource are selected by the administrator using a standard management interface for each compute-resource.

Step 102: The maximum load point for each unique sever type is found, and the selected metrics are measured.

Step 104: Set one of the server types as the standard-server.

Step 106: calculate the capacity weight for the metrics in terms of standard servers.

Step 108: Set the lower and upper global thresholds as allowable percents of the maximum load.

Step 200: Metrics are measured at regular intervals using a standard monitoring system.

Step 202: Normalized, smoothed average metric values are calculated.

Step 204: The current percent of the maximum load vector is computed.

Step 206: The global load values G are calculated from the normalized average metric values P and coefficients $C_1$, $C_2$, $C_3$. The coefficients can be selected by a compute-resource administrator Step 208: Thresholds are adjusted based on the current number of allocated servers.

Step 210: G values are compared to the upper and lower thresholds.

Step 212: A check is made to see if allocations are enabled.

Steps 300-324: Servers are reallocated if thresholds are violated.

It is important to note that "double exponential smoothing" or some other kind of data smoothing should always be used to remove temporary metric peaks and valleys. Smoothing can be performed at one or more steps in the method. For example, time smoothing can be performed when metrics are originally measured (before calculation of P values), on P values after the P values are calculated, and/or on G values after G values are calculated.

Also, in the present invention, more than one server can be moved when a threshold is violated. For example, if a measured G value greatly exceeds an upper threshold, then more than one server can be moved from the free-pool to the overloaded compute-resource. Also, since servers are not necessarily equivalent in the invention, the type of server can be selected according to the magnitude of the threshold violation. If a threshold is strongly violated, then a relatively powerful server can be moved to or from the free-pool.

Thresholds for Fault Detection

Normal load fluctuations make the use of a single, fixed problem determination threshold inadequate. The optimal response time threshold for fault identification will vary as a function of load. In general terms, when the average request response time does not match those predicted by the normal RT curve, there may be a fault in the system.

Figure 4:
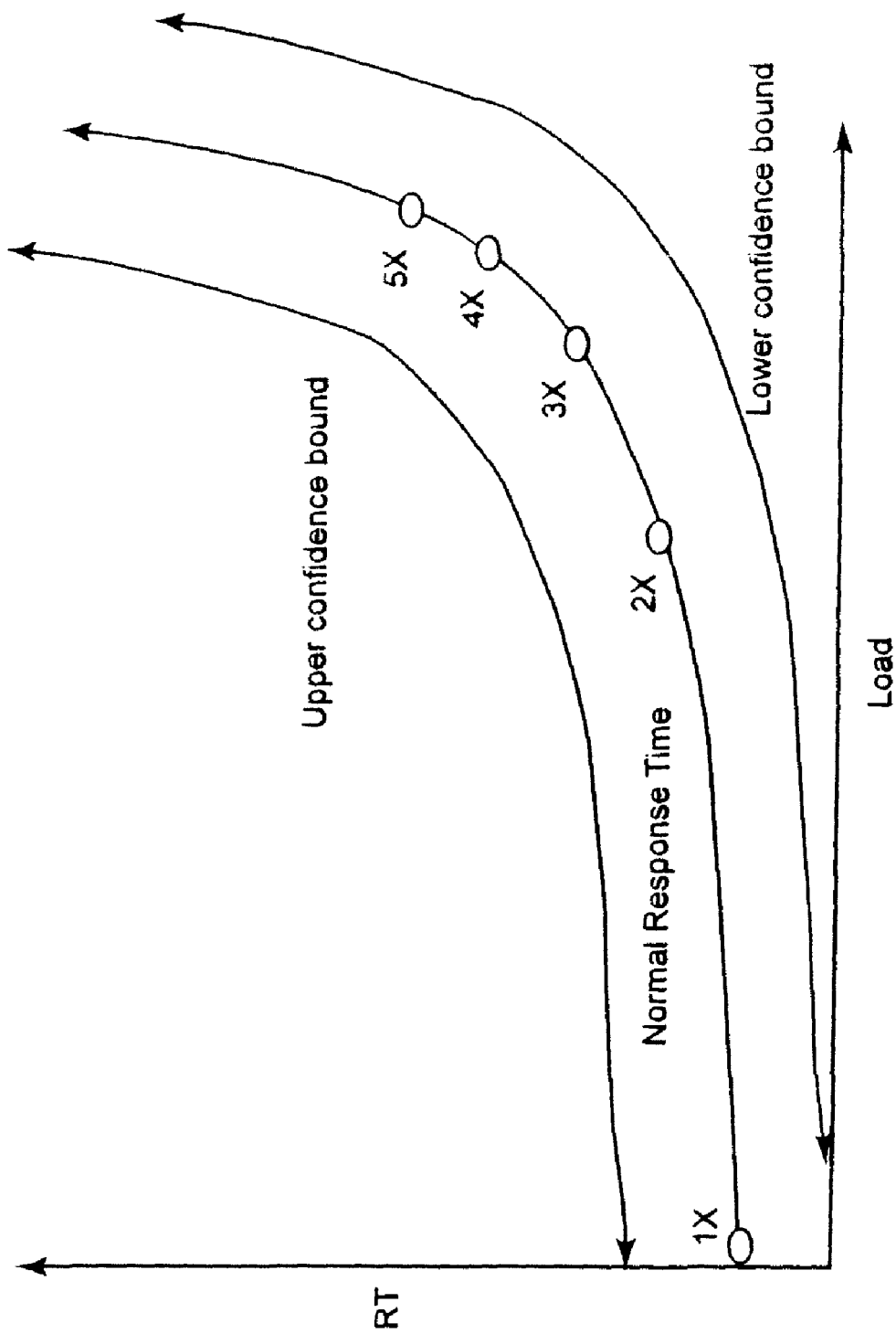
FIG. 4 is a graph showing a plot of response time versus load illustrating prediction bounds.

FIG. 4 shows the response time curve and its confidence bounds. Using nonlinear regression, we can fit a model to our normal RT/Load data. We then compute the simultaneous (based on all observations) prediction bounds for new observations, as illustrated in FIG. 4. The graph contains all three of these curves; specifically, the fitted function, the lower confidence bounds, and the upper confidence bounds. The confidence interval can be set to whatever value is desired; 95% is typical. The response time threshold at any given time should be set to the point along the upper confidence bounds curve corresponding to the maximum anticipated response time under the current load conditions. Each server type will have to have its own threshold function based on its normal response time curve. One can additionally compute an aggregate CCR wide response time curve and use its upper bound curve to identify faults that may not be limited to a single resource. A change point detection algorithm can also be used to detect deviations from the mean or variance.

System Components

Figure 6:
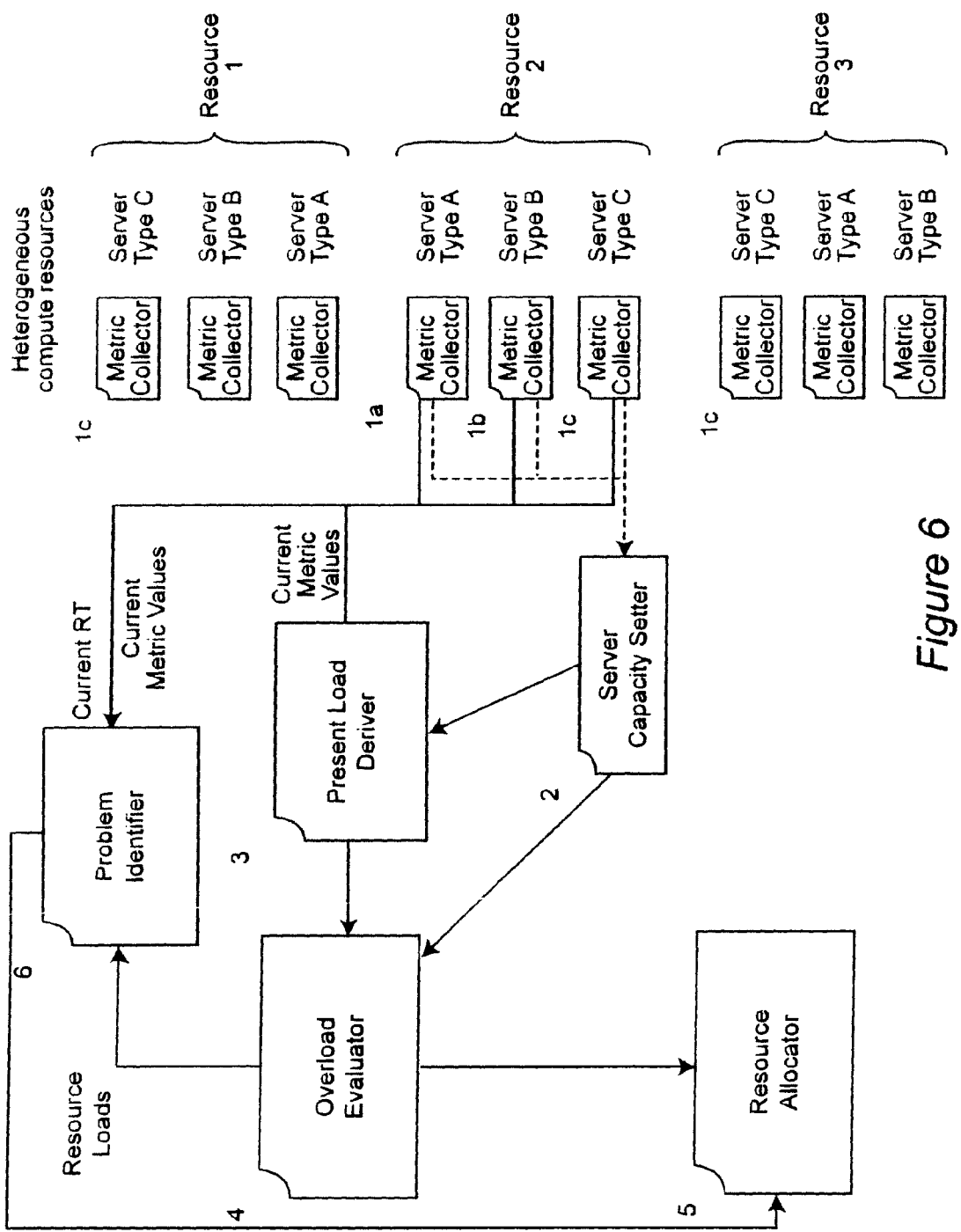
FIG. 6 is a block diagram illustrating a system of heterogeneous compute-resources and the various system components which implement the method of allocating servers according to the invention.

FIG. 6 depicts the various system components for implementing the method according to the invention. The dashed lines represent off line flows, and the solid lines represent runtime flows. Metrics collected from the compute-resource's designated standard server 1a are used to set the compute-resource's capacity or maximum load vector 2. For each server type and each compute-resource that may be assigned to a compute-resource, e.g., 1a, 1b and 1c, a set of capacity weights which relate the server's metric values to the standard server are created. Based on the current set of allocated servers and the present metric values, the current percent of maximum capacity is calculated by the present load deriver 3. These values are fed at runtime into the overload evaluator 4. Compute-resources and system configuration data are used in combination to identify capacity overload by the overload evaluator 4. This in turn is used by the resource allocator 5 and the problem identifier 6, in addition to state and configuration data, to make allocation decisions.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A load driven method for allocating servers among a plurality of compute-resources and a free-pool, wherein each compute-resource comprises a plurality of servers, the method comprising the steps of:

monitoring each server allocated to a compute-resource for at least one metric;
for each monitored metric on a standard server and for each compute-resource, calculating a maximum metric value at a maximum load point as a maximum load vector for a compute-resource;
setting lower and upper global thresholds as allowable percents of the maximum load point;
for each compute-resource and unique server type and for each monitored metric, calculating a capacity weight for the monitored metric;
for each monitored metric and for each compute-resource, calculating an average normalized metric value $P_n$ in standard server units;
for each monitored metric and for each compute-resource, calculating a current percent of a corresponding maximum metric value as a current percent of a maximum load vector;
for each compute-resource, calculating one or more global load values G, wherein each global load value is a linear combination of a normalized current percent of each of the corresponding maximum metric values;
for each compute-resource, dynamically adjusting the lower and upper thresholds for the global load value; and
for each compute-resource, comparing the calculated global load value G to the lower threshold and upper threshold, and performing an allocation of servers to compute-resources based on a comparison outcome.

2. The method of claim 1, wherein following the comparison outcome, if a load is not predicted to continue for more than a predetermined minimum amount of time, do nothing.

3. The method of claim 1, wherein following the comparison outcome, if a predetermined amount of time has not elapsed since a last capacity adjustment, do nothing.

4. The method of claim 1, wherein following the comparison outcome, if servers are available in the free pool and an overloaded compute-resource has a global load value G greater than the upper threshold, then removing a server from the free pool and allocating the server to the overloaded compute-resource.

5. The method of claim 1, wherein following the comparison outcome, if servers are not available in the free pool and an overloaded compute-resource has a global value G greater than the upper threshold, perform resource-negotiation.

6. The method of claim 1, wherein following the comparison outcome, if an under loaded compute-resource has a global load value G less than the lower threshold, and the following inequality is satisfied $$\text{Curr\_Total}_{req/sec} < \frac{\text{Server\_Max}_{req/sec} * (N-1)}{N} - (\text{Server\_Max}_{req/sec} - \text{Server\_Min}_{req/sec})$$

then removing a server from the under loaded compute-resource and allocating it to the free-pool.

7. The method of claim 1 wherein the maximum load values contained in the maximum load vector correspond to the values measured on the standard server when load reaches the response time transition point $$\text{MaxLV}_{compute\_resource} = (M1_{stdr}, \ldots, MN_{stdr}).$$

8. The method of claim 1, wherein a capacity weight of an nth metric on a given compute-resource is calculated according to the equation $$MWn_t = \frac{Mn_t}{Mn_{stdr}}.$$

9. The method of claim 1, wherein each normalized average metric value P is calculated according to the equation $$P_n = \left( \frac{\sum_{s \in S} \text{measured\_valueM}_{n(s)}}{\sum_{s \in S} MWn_{t(s)}} \right)$$

wherein $P_n$ is the present value of metric n on server s in standard server units, m is the number of servers assigned to the compute resource.

10. The method of claim 1, wherein the Current Percent of Maximum Load Vector (% CurrMLV), is calculated according to the equation $$\% \, CurrMLV = \left( \frac{P_1}{M_{1\_stdr}}, \ldots, \frac{P_n}{M_{n\_stdr}} \right).$$

11. The method of claim 1, wherein one or more global load values G are computed for each compute-resource, as a linear combination of a normalized current percent of each of the corresponding maximum values according to the following equation $$\text{Load} = \sum_{n=1}^{N} (C_n * \% \, CurrMLV_n).$$

12. The method of claim 1, wherein the dynamic upper and lower thresholds for the global load value are adjusted using the following equation $$\text{Threshold\_Adjustment} = \frac{\text{Threshold\_High} - \text{Threshold\_Low}}{\text{Size\_Growth\_Interval}}.$$

13. The method of claim 1, wherein a deallocation process is inhibited unless following inequality is satisfied $$\text{Curr\_Total}_{req/sec} < \frac{\text{Server\_Max}_{req/sec} * (N-1)}{N} - (\text{Server\_Max}_{req/sec} - \text{Server\_Min}_{req/sec}).$$

14. A non-transitory computer readable medium containing code which enables a computer to perform a method for allocating servers among a plurality of connected compute-resources and a free-pool, wherein each compute-resource comprises a plurality of servers, the method comprising the steps of:
monitoring each server allocated to a compute-resource for at least one metric;
for each monitored metric on a standard server and for each compute-resource, calculating a maximum metric value at a maximum load point as a maximum load vector for a compute-resource;

setting lower and upper global thresholds as allowable percents of the maximum load point;

for each compute-resource and unique server type and for each monitored metric, calculating a capacity weight for the monitored metric;

for each monitored metric and for each compute-resource, calculating an average normalized metric value $P_n$ in standard server units;

for each monitored metric and for each compute-resource, calculating a current percent of a corresponding maximum metric value as a current percent of a maximum load vector;

for each compute-resource, calculating one or more global load values G, wherein each global load value is a linear combination of a normalized current percent of each of the corresponding maximum metric values;

for each compute-resource, dynamically adjusting the lower and upper thresholds for the global load value; and for each compute-resource, comparing the calculated global load value G to the lower threshold and upper threshold, and performing an allocation of servers to compute-resources based on a comparison outcome.

15. The non-transitory computer readable medium of claim 14, wherein the method, following the comparison outcome, determines if load is not predicted to continue for more then a predetermined minimum amount of time, and if so, does nothing.

16. The non-transitory computer readable medium of claim 14, wherein the method, following the comparison outcome, determines if a predetermined amount of time has not elapsed since the last capacity adjustment, and if so, does nothing.

17. The non-transitory computer readable medium of claim 14, wherein the method, following the comparison outcome, determines if servers are available in the free pool and an overloaded compute-resource has a global load value G greater than the upper threshold, and if so, removes a server from the free-pool and allocating the server to the overloaded compute-resource.

18. The non-transitory computer readable medium of claim 14, wherein the method, following the comparison outcome, determines if servers are not available in the free pool and an overloaded compute-resource has a global load value G greater than the upper threshold, and if so, performs resource-negotiation.

19. The non-transitory computer readable medium of claim 14, wherein the method, following the comparison outcome, determines if an under loaded compute-resource has a global load value G less than the lower threshold, and if so, removes a server from the under loaded compute-resource and allocating it to the free-pool.

* * * * *